United States Patent [19]

Bullis et al.

[11] 4,003,254
[45] Jan. 18, 1977

[54] ION COLLECTOR

[75] Inventors: Robert H. Bullis, Avon; Walter J. Wiegand, Jr., Glastonbury, both of Conn.

[73] Assignee: United Technologies Corporation, Hartford, Conn.

[22] Filed: Aug. 18, 1975

[21] Appl. No.: 605,689

[52] U.S. Cl. ............................................. 73/194 F
[51] Int. Cl.² ........................................ G01F 1/56
[58] Field of Search ..................... 73/194 F; 324/33; 310/5, 6

[56] References Cited

UNITED STATES PATENTS

| | | | |
|---|---|---|---|
| 3,054,553 | 9/1962 | White | 310/5 X |
| 3,470,741 | 10/1969 | Durbin | 73/194 F |
| 3,544,888 | 12/1970 | Sellen, Jr. | 324/33 X |
| 3,648,517 | 3/1972 | Dorman | 73/194 F |
| 3,679,973 | 7/1972 | Smith, Jr. et al. | 73/194 X |

*Primary Examiner*—Charles A. Ruehl
*Attorney, Agent, or Firm*—Anthony J. Criso

[57] ABSTRACT

New and improved ion collection means for use in flow meter apparatus which utilizes the migration of ions transverse to the direction of flow of a moving fluid to determine flow characteristics are disclosed. The ion collector comprises individual strips of electrically conductive material arranged in an orderly manner at the collection site. The strips are physically separate and connected in electrical series with each other through suitable resistors which are protected from the flow of moving fluid.

6 Claims, 1 Drawing Figure

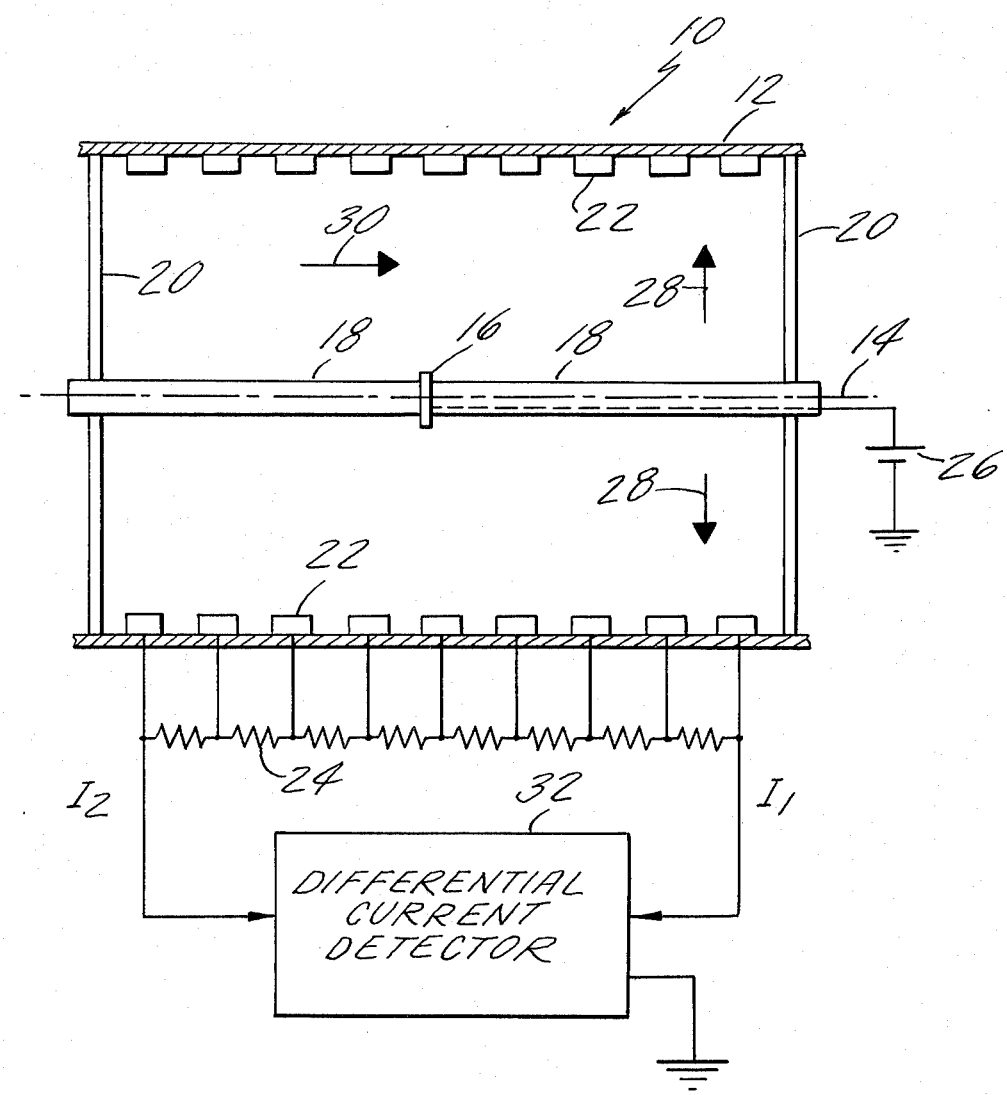

ION COLLECTOR

BACKGROUND OF THE INVENTION

1. Field of Invention

The present invention relates to flow meters and more particularly to improved current collection means in an ion flow meter.

2. Description of the Prior Art

In many devices involving the movement of a fluid, means for measuring flow characteristics such as the mass flow, flux and velocity of the fluid are required. A device of this type is disclosed in U.S. Pat. No. 3,470,741 entitled Mass Flow Meter Apparatus issued on Oct. 7, 1969 to E. J. Durbin. The apparatus is described in terms of a mass flow meter and its overall operation is straightforward. The fluid of interest is passed through the meter which includes ionizing means proximate to the path of fluid flow and ion collecting means also proximate to the path of fluid flow and opposite to the ionizing means. The operation of such apparatus includes energizing the ionizing means to provide a source of ions at the boundary of the stream of fluid. As the fluid moves along a flow axis, the ions migrate across the flow stream in a direction essentially perpendicular to the flow axis as a result of an applied electric field and are collected on an ion receiving electrode means which is a distributed collector resistor comprising a nonconductive substrate such as glass and a resistive member such as wound wire or a resistive coating on the substrate. The ions introduced into the stream from the ion source have a spatial and energy distribution with average properties which can be represented by the median ion. During the ion migration across the stream, the motion of the fluid displaces the position of the median ion in the direction of flow in an amount which is exactly proportional to the flow velocity of the stream, assuming fluid particle density is constant. Alternatively the displacement is proportional to flux assuming that both the flow velocity and density are variable. The position on the ion receiving means at which the median ion is collected is established by measuring the electric currents passing from the upstream and downstream terminations of the resistive member and this median ion displacement information is converted to velocity or flux.

As a practical matter, the accuracy of the device in a normal working environment is often compromised due to the formation of a nonuniform coating on the distributed collector resistor. The coating so formed causes the current in the collector due to ion migration across the fluid transverse to the flow direction to be sensed in a manner which is unrelated to the flow of the fluid. The performance of such apparatus could be improved significantly if the effective electricl resistance of the ion collector means could be desensitized with respect to the buildup of nonuniform coatings.

SUMMARY OF THE INVENTION

An object of the present invention is to provide a reliable ion collector construction in a flow sensing apparatus.

In an apparatus for sensing flow characteristics of a fluid passing through a conduit along a flow axis wherein the apparatus includes means for producing a distribution of ions in the fluid stream and means for collecting such ions after they have migrated across the flowing stream in a direction substantially perpendicular to the flow axis, an improvement according to the present invention including ion collection means comprising a plurality of discrete ion collection surfaces such as metal strips transverse to the flow axis and physically separated from each other, the strips being connected in electrical series with each other through electrical resistances interposed therebetween and located out of the flowing stream.

A main advantage of the distributed collector resistor in accordance with the present invention is its insensitivity to the formation of nonuniform coatings on the ion collection surfaces. The entire ion collection surface comprises a plurality of individual collection surfaces which are physically separated from each other but connected in electrical series with an electrical resistance between adjacent surfaces. Also, each resistor is located in an area protected from the flow of the main stream. The ions migrate essentially radially from the source region to the collection region across the fluid flow in a direction which is essentially perpencidular to the direction of fluid flow and are deflected in the direction of flow by the fluid forces.

The foregoing and other objects, features and advantages of the present invention will become more apparent in the light of the following detailed description of a preferred embodiment thereof as discussed and illustrated in the accompanying drawing.

BRIEF DESCRIPTION OF THE FIGURE

The FIGURE shows a simplified schematic of an improved ion collector in accordance with the present invention in a deflection fluid meter in which the ions migrate perpendicular to the direction of fluid flow.

DESCRIPTION OF A PREFERRED EMBODIMENT

A simplified flow meter apparatus 10 accordance with the present invention is shown in cross section in the FIGURE. The apparatus comprises a cylindrical housing 12 having a centerline axis 14 and an ion source 16 positioned along the centerline and held in position by an axial rod 18 and radially extending struts 20. A plurality of collector rings 22 is placed along the main surface of the cylinder, each ring being physically separated from the adjacent rings and all the rings being connected in electrical series with a string resistor 24 in the electrical circuitry joining adjacent rings. A power supply 26 provides electric power to the ion source 16. The housing is constructed of a dielectric mateial such as suitable ceramic or plastic composition and support the rings about the source. Similarly, the axial rod and struts are dielectric material. For the embodiment shown, the rings are individual hoops made typically of a good electrical conductor such as copper.

In the opertion of this apparatus, the power supply 26 is actuated to cause the ion source to provide in the region immediately adjacent to the source 16 a plurality of ions. The ions drift due to the force imparted by the applied electric field extending essentially perpendicular to the centerline 14 between the ion source and the collector rings, and migrate in a radial direction 28 toward the collector rings. When a fluid such as air is passed through the apparatus in the axial direction 30, the air exerts additional body forces on the migrating ions causing the ion distribution which migrates from the source 16 to be deflected downstream in an amount which is directly proprotional to the relative magnitude of body forces due to the air flow as compared with the forces due to the electric field. When the deflectable distribution of ions impacts on the collector rings, electric currents are set up in these rings. The axial position at which the median ion impacts the collector ring is a measure of the downstream deflection of the entire ion distribution due to the fluid flow force in the axial direction. This position is measured with precision by monitoring the down stream current, $I_1$, and the upstream current, $I_2$, through the collector rings with a differential current detector 32, for example, as is discussed in U.S. Pat. No. 3,470,741.

The accuracy of the above described and similar flow meters can be no better than the precision with which the exact point of impact of the median ion can be determined. In the prior art devices which use a wound wire or a resistive coating as the ion collector, any interference with the uniformity of the electrical resistance of the ion collector can result in erroneous differential current readings. As a practical matter such interference is not uncommon since the effective resistance of these collectors which are in the fluid stream per se is easily changed due to coating buildup or local short circuiting. By way of contrast, the ion collector in accordance with the present invention provides a low resistance collection surface in the stream of flowing fluid. The actual ring 22 offers a very low electric resistance and yet the electric potential between adjacent rings can be selected and made essentially constant because the resistance between adjacent rings is independent of the collector material characteristics, is not subject to change during operation due to coating buildup, and can be made arbitrarily large with respect to the electrical resistance of the collector rings. For a flow meter apparatus such as is described in U.S. Pat. No. 3,470,741, an ion collector means in accordance with the present invention permits the elimination of a substantial source of meter error by improving the accuracy with which the impingement point of the median ion can be measured.

In many practical configurations, the axial extent of the deflectable ion distribution is of the same magnitude as the ion source to collector spacing. If the gap between the collector and the source is two centimeters, the dimension of a typical segmented collector centered opposite the ion source is at least about two centimeters in length, and is preferably at least four centimeters overall in order to insure the undistorted collection of all the ion current. Adequte resolution of small axial deflections of the ion distribution is accomplished by dividing the expected ion impingement area into ten or more axial segments. Thus, for a two-centimeter device, the thickness of each ring segment in the flow direction could be approximately one and one half millimeters with a gap of half a millimeter between adjacent rings. This gap provides a sufficiently high degree of insulation such that net resistance between segments is controlled by the string resistors. These resistors are very small in value compared with the effective source impedance of the ion current which is typically tens of megohms.

Reasonable resistor values are in the range of ten to ten thousand ohms, the specific value being selected on the basis of leakage and signal-to-noise considerations of the overall system.

In many practical applications, the collector segments can become coated by dielectric or conductive material during sustained operation. As a practical matter, if a coating is formed on the surface of the collector and the coating is highly conductive electrically, the operability of this collector is not affected. This is in sharp contract to the prevailing condition which exists with respect to the continuous collector surfaces currently in use. Alternatively, even if a coating which is highly resistive is formed on the exposed surface of a collector segment, the collected ions eventually find their way to protected or shielded portion of the collector surface and the current passes into the appropriate resistor with no highly detrimental effect. Certain configurations of the collector ring such as one with a T-shaped cross section to provide a shield area not directly exposed to the flow may be most suitable for environments where coating by a dielectric is anticipated. Thus, the present segmented design provides ion deflection information which is comparatively unaffected by layers of either conductive or dielectric material on the collectors.

This invention is described in terms of a flow meter having an ion source electrode located along the centerline of a housing having a circular cross section. Alternate ion sources and housing geometries are readily amenable to the arrangement of this ion collector. Also, the specific examples of device size and element value indicated are illustrative although not exhaustive of those compatible with a typical collector design.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. In an apparatus for sensing the flow of fluids passing along a flow axis through the apparatus which includes:
    means proximate to the fluid flow for producing ions in the fluid;
    means proximate to the fluid flow for collecting ions, the collection means being separated from the ion production means and extending in the direction of fluid flow; and
    means responsive to the position of impingement of the ions on the collection means to measure the displacement of the ions along the flow axis due to the flow of the fluid along the axis during the ion migration across the flow from the production means to the collection means;
    an improved ion collection means comprising a plurlity of discrete ion collectors arranged adjacent to each other along the flow axis, the collectors being spaced apart physically and connected in series electrically with an electric resistance in the connection between adjacent collectors.

2. The invention according to claim 1 wherein the electric resistance in the connection between adjacent collectors is located remote from the stream of fluid passing through the apparatus along the flow axis.

3. The invention according to claim 2 wherein each ion collector is a continuous strip of metal.

4. The invention according to claim 3 wherein the apparatus is essentially circular in cross section and the ion collectors are rings.

5. The invention according to claim 4 wherein the ions are produced with a corona discharge.

6. The invention according to claim 5 wherein the ions are produced at a point source.

* * * * *

UNITED STATES PATENT OFFICE
CERTIFICATE OF CORRECTION

PATENT NO. : 4,003,254
DATED : January 18, 1977
INVENTOR(S) : ROBERT H. BULLIS ET AL It is certified that error appears in the above-identified patent and that said Letters Patent are hereby corrected as shown below:

Column 2, line 36    after the number "10" insert -- in -- line 50    "support" should read -- supports --

Column 4, line 2     "contract" should read -- contrast -- line 7     after the word "to" insert -- a --

Signed and Sealed this

Third Day of May 1977

[SEAL]

Attest:

RUTH C. MASON
*Attesting Officer*

C. MARSHALL DANN
*Commissioner of Patents and Trademarks*